United States Patent
de Buda

(10) Patent No.: US 6,549,120 B1
(45) Date of Patent: Apr. 15, 2003

(54) DEVICE FOR SENDING AND RECEIVING DATA THROUGH POWER DISTRIBUTION TRANSFORMERS

(75) Inventor: Eric de Buda, Toronto (CA)

(73) Assignee: Kinectrics Inc., Toronto (CA)

( * ) Notice: Subject to any disclaimer, the term of this patent is extended or adjusted under 35 U.S.C. 154(b) by 0 days.

(21) Appl. No.: 09/718,504

(22) Filed: Nov. 24, 2000

(51) Int. Cl.$^7$ .............................................. H04M 11/04
(52) U.S. Cl. ............................ 340/310.01; 340/310.02; 340/310.03; 340/310.06
(58) Field of Search ...................... 340/310.01, 310.02, 340/310.03, 310.06, 310.07, 310.08; 370/330, 332; 375/316, 317

(56) References Cited

U.S. PATENT DOCUMENTS

| | | | |
|---|---|---|---|
| 3,942,170 A | * 3/1976 | Whyte | 340/310.01 |
| 4,040,046 A | * 8/1977 | Long et al. | 340/310.01 |
| 4,142,178 A | 2/1979 | Whyte | 340/310.01 |
| 4,300,126 A | 11/1981 | Gajjar | 340/310.01 |
| 4,323,882 A | 4/1982 | Gajjar | 340/310.01 |
| 4,371,867 A | 2/1983 | Gander | 340/310.01 |
| 4,378,533 A | 3/1983 | Carnel | 340/310.01 |
| 4,419,758 A | 12/1983 | Dorey | 375/38 |
| 4,468,792 A | * 8/1984 | Baker et al. | 375/45 |
| 4,517,548 A | 5/1985 | Ise et al. | 340/310.01 |
| 4,538,136 A | 8/1985 | Drabing | 340/310.01 |
| 4,556,864 A | 12/1985 | Roy | 340/310.01 |
| 4,556,866 A | 12/1985 | Gorecki | 340/310.01 |
| 4,633,218 A | 12/1986 | Palsgrove et al. | 340/310.01 |
| 4,636,771 A | 1/1987 | Ochs | 340/310.01 |
| 4,714,912 A | * 12/1987 | Roberts et al. | 340/310.01 |
| 4,885,563 A | 12/1989 | Johnson et al. | 340/310.01 |
| 5,404,127 A | 4/1995 | Lee et al. | |
| 5,406,249 A | 4/1995 | Pettus | 340/310.06 |
| 5,424,709 A | 6/1995 | Tal | 340/310.01 |
| 5,467,011 A | 11/1995 | Hunt | 324/67 |
| 5,485,040 A | 1/1996 | Sutterlin | 307/3 |
| 5,644,598 A | 7/1997 | Bidese | |
| 5,717,685 A | * 2/1998 | Abraham | 370/30 |
| 5,757,177 A | * 5/1998 | Farnsworth | 324/72 |
| 5,777,769 A | * 7/1998 | Continho | 359/173 |
| 5,870,016 A | 2/1999 | Shrestha | 340/310.02 |
| 6,069,457 A | 5/2000 | Bogdan | 315/291 |
| 6,115,429 A | * 9/2000 | Huang | 375/317 |
| 6,157,292 A | * 12/2000 | Piercy et al. | 340/310.01 |

FOREIGN PATENT DOCUMENTS

| | | |
|---|---|---|
| JP | 60051335 | 3/1985 |
| JP | 63287119 | 11/1988 |

\* cited by examiner

*Primary Examiner*—Toan Pham
(74) *Attorney, Agent, or Firm*—Bereskin & Parr

(57) ABSTRACT

A powerline communication system including a transmitter having a pair of terminals for connection to the power lines. The transmitter comprises a carrier frequency generator for generating a carrier frequency modulated by the data signal and a switching circuit connected to the carrier frequency generator for being switched by the carrier frequency generator for generating a carrier signal having the carrier frequency. The switching circuit is connected to the terminals for providing the generated carrier signal thereto. The switching circuit comprises at least one storage means for storing energy when generating a portion of a cycle of the carrier signal and providing the stored energy when generating another portion of the cycle of the carrier signal. The system also comprises a receiver coupled to the power lines. The receiver includes a filter means for filtering the carrier signal from the power line signal and a demodulator connected to the filter means for extracting the data signal from the carrier signal. Both the transmitter and receiver may utilize a digital algorithm in a computing device to synchronize the carrier signal to the power line frequency to adaptively track changes in the power line frequency to minimize interference with power line harmonics and provide accurate frequency alignment between the transmitter and receiver.

60 Claims, 5 Drawing Sheets

DEVICE FOR SENDING AND RECEIVING DATA THROUGH POWER DISTRIBUTION TRANSFORMERS

FIELD OF THE INVENTION

This invention relates generally to power line communications systems. In a particular embodiment, it relates to a power line communication system for use in communicating through a distribution transformer.

BACKGROUND OF THE INVENTION

Power line or "carrier-current" communication systems employ existing alternating current power lines to transfer information which would normally require an additional hard wire installation. Power line communication systems are well-known and extensively used. However, power line communication systems which are capable of communicating through a distribution transformer must overcome both the attenuation of high carrier frequencies due to the impedance of the distribution transformer and the noise on power lines at lower frequencies.

Power line communication systems that have the capability of sending data along a signal path that includes distribution transformers are known. However, the methods by which these systems have addressed the twin problems of attenuation of high carrier frequency data signals by the distribution transformer and noise on the power line at lower frequencies have disadvantages.

Where lower carrier frequencies are used, the transmitters tend to be expensive, bulky and power hungry and require special installation. In other cases where lower carrier frequencies are used, the transmitter may be small, but the receiver is bulky and expensive and the system is not capable of sending and receiving data at a useful rate.

Where known power line communication systems use high carrier frequencies for communication along a signal path that includes distribution transformers, they require additional elements beyond the transmitter and receiver in order to overcome the attenuation problems associated with communicating through the distribution transformer. As a result, these systems cannot be installed by simply plugging a transceiver into a typical wall outlet.

One earlier proposal that addresses the problem of attenuation when communicating through a power distribution transformer using a high carrier frequency is found in U.S. Pat. No. 4,406,249 issued to Pettus. U.S. Pat. No. 4,406,249 suffers from the disadvantage that coupling capacitors must be installed in common mode such that the carrier frequency signals can be introduced on both secondary leads. Common mode coupling requires access to both secondary leads from the distribution transformer and a typical wall outlet only allows access to one of these leads. Therefore, a transceiver according to this patent could not be installed by simply plugging it into a wall outlet using this system. Also, the high carrier frequency of 230 kHz which Pettus teaches is high enough to cause radio interference and produce signal node points along the power line where the signal is too weak to be picked up.

Another earlier proposal that addresses the problem of attenuation when using a high carrier frequency to communicate over power lines where the signal path includes distribution transformers, is found in U.S. Pat. No. 4,142,178 issued to Whyte. U.S. Pat. No. 4,142,178 does not teach a method of communicating through a distribution transformer, rather it teaches a high voltage signal coupler which is used to couple a high voltage distribution network primary conductor to the communication elements. This method bypasses the distribution transformers. While this alleviates the problem of attenuation, as the communication system is not connected to the secondary of the distribution transformers it cannot be installed by simply plugging the transceivers into wall outlets. Also, the coupling system requires installation of magnetic cores on the high voltage and ground conductors of the power line system which is relatively complex and adds cost. Frequency shift keying (FSK) is a known power line communication technique wherein the transmitter modulates a reference frequency signal based upon the data to be transmitted, so that the transmitted signal has a frequency which is either higher or lower depending on whether a logic 1 or a logic 0 is being transmitted. The receiver is designed to demodulate the transmitted FSK signal to produce a serial data stream at a predetermined rate (baud rate). In order to generate an accurate reference frequency, the nominally 60 Hz power-line frequency can be used. An earlier example of the use of the power line frequency as a reference frequency for generating the carrier frequency in an FSK system can be found in U.S. Pat. No. 4,556,866 issued to Gorecki. However, U.S. Pat. No. 4,556,866 suffers from the disadvantage of using a phase locked loop in conjunction with the power line frequency in order to generate the reference frequency. Phase locked loops are a source of noise, are prone to instability, and are sensitive to component values which can change with temperature and age. These disadvantages make it undesirable to use a phase locked loop in a FSK transmitter designed to communicate through a distribution transformer.

Known power line communication system transmitters use amplifier circuits in which the design is optimized for parameters not related to energy efficiency. The presence of energy losses results in heat dissipation, which requires additional energy for producing the signal, but more significantly results in a larger physical size being required for the transmitter. This is needed to provide the extra surface area required to remove the heat without high temperatures developing which could cause failure of the device. It is known that efficiency of the amplifier can be improved through the use of switch mode amplifiers instead of the more common but less efficient linear amplifiers, but even such devices will not achieve the best efficiency for a power line signal transmitter if they are optimized for parameters that are not relevant to this purpose.

It is also known to use a resonant coupling network which is "tuned" to resonate at the carrier frequency to couple the carrier frequency signal to the power line in order to increase signal level. The use of a resonant or "tuned" circuit to boost the transmitter signal is common. A resonant circuit comprises one or more inductors and one or more capacitors either in series or in parallel so that energy is transferred back and forth between the inductors and capacitors in a cyclic manner at the power line carrier frequency, in a manner that is analogous to the way a weight bobs up and down when suspended by a spring. In the simple case where there is only one inductor and one capacitor, electrical resonance is achieved by selecting the inductor and the capacitor such that:

$$f = \frac{d}{2\pi\sqrt{LC}}$$

where:
f=power line carrier frequency in cycles/second
π=3.14159265358979 . . .
L=inductance in Henrys
C=capacitance in Farads
d=duty cycle (between 0 and 1)
Normally "d" is set to 1 unless the resonant network is switched.

When a resonant circuit is used to couple the carrier frequency signal onto the power line, an increase in transmitter efficiency is achieved. In some cases, energy efficiency may still be low, particularly if the network is primarily designed to attenuate unwanted frequencies. Also, the known techniques of producing resonance also tend to introduce energy losses which substantially reduce efficiency improvements. Sometimes these losses occur in resistive elements added to the resonant circuit. In other cases, the losses occur because the amplifiers or transistors, which drive the resonant network, are running in a linear mode. In this mode, they are neither completely off nor completely on. Therefore, they dissipate heat the way resistors do. Sometimes, the losses occur because of large current surges through semiconductor components, which result when capacitors are suddenly charged up or discharged. Even though these surges may be very brief, they can cause much heating since heating is proportional to the square of the current level. While the cost of the energy may not be a problem, heat dissipation, particularly in semiconductors increases the need for heat dissipation material which adds to the size weight and cost of the transmitter.

Examples of proposals using resonant circuits to improve transmitter efficiencies in power line communication systems can be found in U.S. Pat. No. 4,142,178, U.S. Pat. No. 4,323,882, U.S. Pat. No. 4,517,548, U.S. Pat. No. 4,636,771, U.S. Pat. No. 4,885,563, U.S. Pat. 5,485,040, and U.S. Pat. No. 5,870,016. However, each one of these references suffers from one or more of the disadvantages described in the preceding paragraph.

Efficiency is also an issue in the receiver circuit used in a power line communication system. The use of analog circuit methods in receivers is known. A disadvantage of analog circuit methods is that frequency pass bands are set by networks of reactive components whose values may change due to temperature and other factors. Unintended changes in component values can result in a loss of signal.

It is also known to use digital methods to process the received signals. The use of quartz crystal oscillator based digital frequency synthesis allows the frequency pass bands to be set much more accurately. However, the accuracy is still limited by the accuracy of the quartz crystal oscillator which also may be affected by temperature and other factors. Digital signal processing methods may also suffer from digitization errors, particularly if the signal level is small in comparison with the voltage resolution of the analog-to-digital converter that is used. The effect of this is to increase the need for averaging, thereby reducing the data rate achievable.

Accordingly, there is a need of a power line data communication system where both the transmitter and receiver are small in size and weight, and where both are easily installed, simply by plugging into an ordinary electrical outlet without the need for repeaters, coupling networks or additional equipment, and where data signals can sent and received at useful rates through distribution transformers.

One advantage of such a communication scheme would be to facilitate transfer of routine and relatively small quantities of date to individual customers or electrical utility, including both residential and industrial customers of an electrical utility, including both residential and industrial customers. Indeed, one expected usage is reading of electricity meters, to enable recording of the amount of electricity used and generation of bills. Currently, reading of meters has to be done manually, which is time consuming and expensive, and if, for example, a residential or other customer is not available, the meter may not be at an external location for reading.

It is also possible that such scheme could be used to read a variety of other utility meters, for example, gas and water meters. While other widespread telecommunication networks are known, using power lines has some advantages. The infrastructure is inherently in place. If a system is set up to bill customers on a periodic basis, e.g. monthly, then it is a simple matter to extend this to gathering additional data from other meters at the same location.

The quantity of data, to be transmitted is, by telecommunication standards, low, so that it is possible to consider collecting and transmitting data for various devices together.

BRIEF SUMMARY OF THE INVENTION

It is therefore desirable to provide a power line communications system for use in communication of data over power lines, including through a distribution transformer and capable of being installed by plugging into a wall outlet, said power line communications system comprising a transmitter having a pair of terminals for connection to the power lines. The transmitter comprises a carrier frequency generator for generating a carrier frequency modulated by the data signal and a switching circuit connected to the carrier frequency generator for being switched by the carrier frequency generator to generate a carrier signal having the carrier frequency. The switching circuit is connected to the terminals for providing the generated carrier signal thereto. The switching circuit comprises at least one storage means for storing energy when generating a portion of a cycle of the carrier signal and providing the stored energy when generating another portion of the cycle of the carrier signal. The system also comprises a receiver coupled to the power lines. The receiver includes a filter means for filtering the carrier signal from the power line signal and a demodulator connected to the filter means for extracting the data signal from the carrier signal.

In a further aspect, the present invention may also comprise a carrier frequency generator for continuously calculating a carrier frequency as a function of the power-line frequency for adaptively tracking changes in the power-line frequency. The carrier frequency generator has a synchronization input for connection to the power lines and the transmitter generates a carrier signal having the carrier frequency and provides the carrier signal. The system further comprises a receiver for connection to the power lines. The receiver comprises a filter means for filtering the carrier signal from the power signal, a demodulator for extracting the data signal from the carrier signal, and a synchronization input for connection to the power lines. The receiver continuously generates a carrier decode frequency as a function of the power-line frequency for adaptively tracking changes in the power-line frequency and for demodulating the carrier signal. Both the demodulator and carrier frequency generator utilize a digital algorithm for calculating the carrier frequency and the carrier decode frequency thereby providing frequency alignment between the transmitter and the receiver.

BRIEF DESCRIPTION OF THE DRAWINGS

The foregoing and other objects, features, and advantages of the present invention will be apparent to those skilled in the art from the following drawings which show a preferred embodiment of the present invention, and, in which.

DETAILED DESCRIPTION OF THE PREFERRED EMBODIMENT

Figure 1:
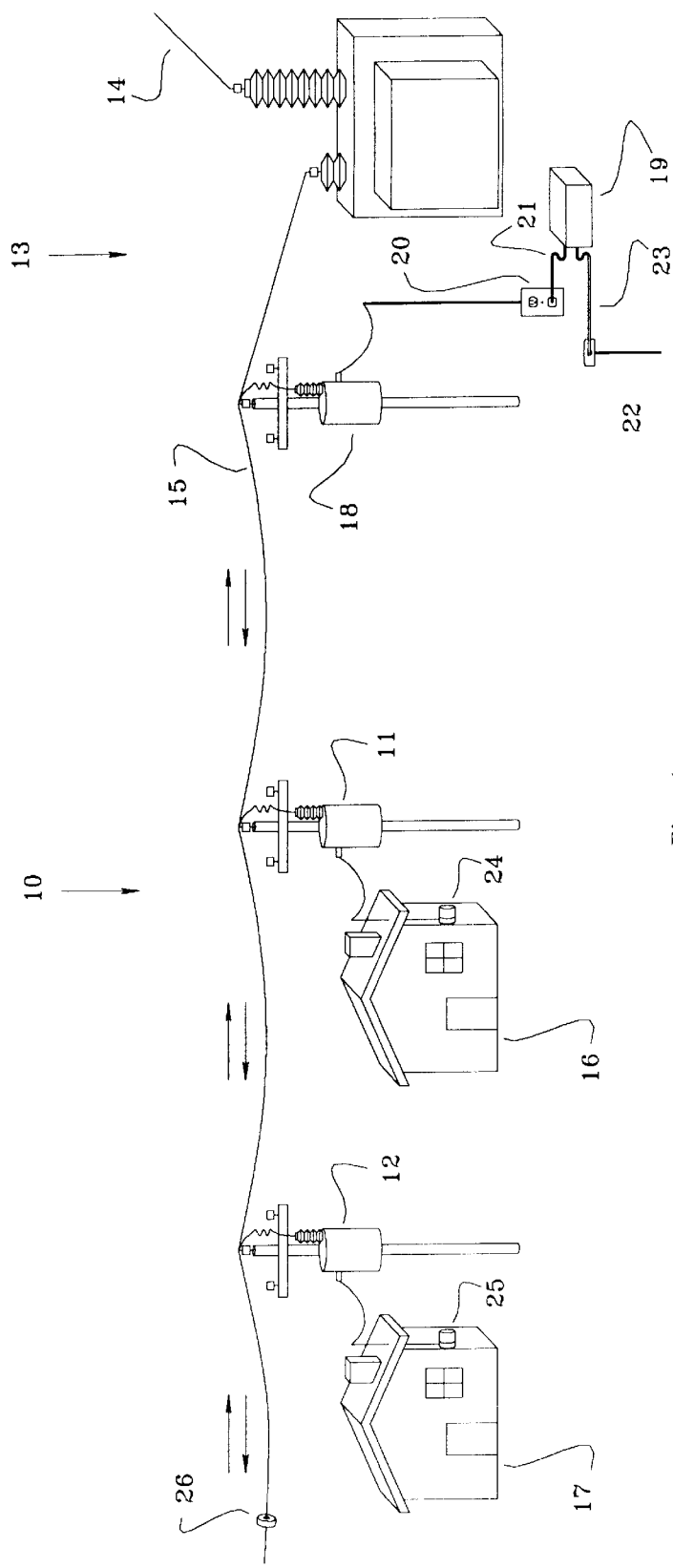
FIG. 1. is a block diagram of an implementation of a bi-directional power line data communication system, according to the present invention.

Reference is made to FIG. 1., which shows a portion of a typical high voltage electrical power distribution system 10, with distribution transformers 11 and 12 connected thereto. At a transformer station 13 the three wire transmission line voltage 14, for example in the range of 25 kV to 500 kV, and commonly in North America at 69 kV is stepped down and supplied to the distribution transformers 11 and 12 via the four wire power line 15, which, for example, is at voltage in the range 8 kV to 35 kV, and commonly in North America at 25 kV. The houses 16 and 17 are supplied with electrical power at voltage which is stepped down from the power line voltage by the distribution transformers 11 and 12. In North America two of the three phases are stepped down to 240V between phases and 120V for one phase.

Accordingly, two phases of the power line signal are supplied to the residences. At the transformer station 13, distribution transformer 18 steps down the power line voltage for the purpose of the powering any auxiliary equipment which may be required at the transformer station 13.

The foregoing components are conventional in a power distribution system. In accordance with the present invention, a power line-to-telephone interface unit 19 includes a power line data transmitter according to the present invention, a power line data receiver according to the present invention and a telephone data interface circuit commonly known as a modem. The interface unit 19 is connected to an ordinary electrical power outlet 20 by a power cord 21. The electrical power outlet is connected to the secondary side of the distribution transformer 18. The interface unit 19 is also connected to the telephone line 22 by a telephone cord 23. Similarly, although not shown, at each electricity meter, as at the electricity meter 24 of house 16 and electricity meter 25 of house 17, a power line data transmitter and a power line data receiver both according to the present invention are also located. Conveniently, a single unit including both the transmitter and the receiver, is provided for each customer. It will also be appreciated that, although residential installations are shown schematically in FIG. 1, such units can be located at any meter, e.g. an industrial customer, and for some uses could even be located at sites without electricity meters.

An electrical utility computer (not shown), is located anywhere where there is access to a telephone line (not shown), and, in use, dials up the power line-to-telephone interface unit 19, via the telephone line 22, and causes the transmitter of the interface unit 19 to send data in the form of an instruction to be sent down power line 15, for example, to the data receiver at the electricity meter 24 of house 16. An example of a typical instruction is a request for a meter reading. The power line data transmitter located at the electricity meter 24 of house 16 could then transmit the meter reading back along the power line 15. Again, this would be encoded so that only the receiver at the interface unit 19 would respond to the data sent in response to the meter reading request. The power line-to-telephone interface unit 19 in turn transmits the data by telephone back to the electrical utility computer (not shown). In the process of this data communication, the data signal has had to pass through the distribution transformer 18 and the distribution transformer 11 in both directions. In addition to the example given above, the power line-to-telephone interface unit 19 could also communicate with a power line monitor 26 which collects data on power flow, as well as monitor and control other devices.

Figure 2:
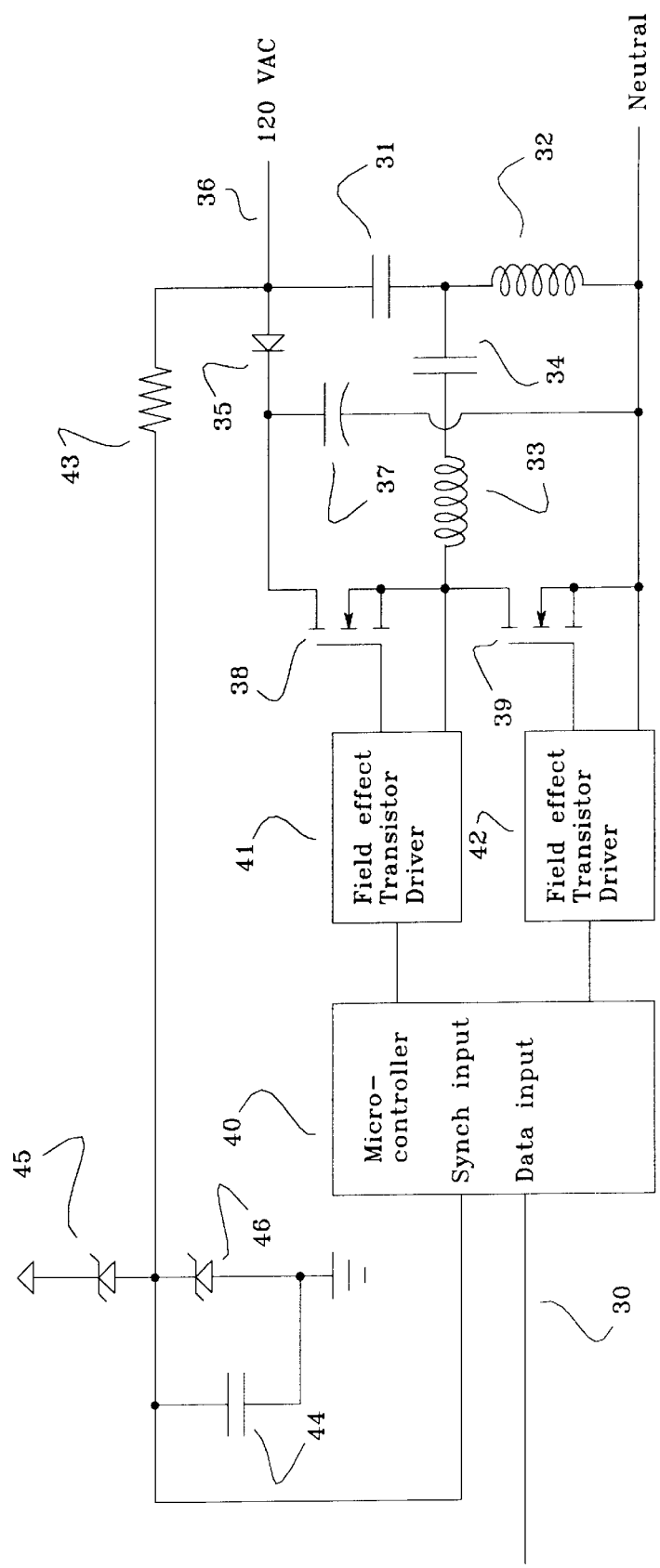
FIG. 2. is a schematic diagram of a power line data transmitter according to the present invention.

Referring now to FIG. 2. a carrier frequency generator is shown which generates a carrier signal using a computing device which can be synchronized to the power line at the synch input to the computing device 40. The circuit applies the carrier signal to the power line to transmit the data. The circuit has a data input 30 for receiving a data signal. A capacitor 31 and an inductor 32 are connected in series to form a reactive network across the secondary side of the distribution transformer. The capacitor 31 and inductor 32 can have values of 1 uF and 2.76 mH to give a resonant frequency of 3.03 kHz. An additional inductor 33 and capacitor 34 are connected in series to form an additional reactive network. One outside terminal of capacitor 34 is connected to the junction between the first inductor 32 and the first capacitor 31. The values of capacitor 31 and inductor 32 are chosen such that resonance is achieved in this reactive network at the selected carrier frequency. (Selection of the carrier frequency is detailed below). The values of inductor 33 and capacitor 34 are chosen so that they would resonate at twice the carrier frequency if they were not switched. However, because they are switched with a duty cycle of 50% or d=0.5, capacitor 33 and inductor 34 will in fact resonate at the carrier frequency. The effect of the switching is that, in accordance with waveforms 83 and 84 on FIG. 4, half of the time a circuit is made through inductor 33 and capacitor 34 because one of the field effect transistors 38 or 39, is turned on. The other half of the time both field effect transistors are turned off and no circuit is made through inductor 33 and capacitor 34. The effect of inductor 33 and capacitor 34 is to control the energy which flows through the field effect transistors 38 and 39. If inductor 33 and capacitor 34 were to be replaced by a direct connection between field effect transistors 38 and 39 and the first inductor 32 and the first capacitor 31, the resulting energy flow would be greater and field effect transistors 38 and 39 may overheat. If inductor 33 and capacitor 34 were replaced by a resistor of sufficient resistance to protect field effect transistors 38 and 39 heat loss in said resistor would reduce the energy efficiency of the circuit. A less efficient circuit would be larger and heavier than that which is disclosed in the preferred embodiment. If, instead of the resistor, a sole capacitor were used in place of inductor 33 and capacitor 34, and the capacitor had an appropriate value, it may be able to control the said energy flow through field effect transistors 38 and 39, with less loss than using a resistor. However, due to the performance characteristics of capacitors, if a capacitor were used to control energy flow, current would spike whenever either field effect transistor 38 or 39, were turned on. These current spikes would cause additional heating in the field effect transistors 38 and 39 as heating is proportional to the square of the current. As a result, field effect transistors 38 and 39 could require heat sinks to dissipate this additional heat. Again, this would add to the size, weight, and cost of the circuit and reduce its energy efficiency. If a sole inductor were used in place of inductor 33 and capacitor 34, and the inductor had an appropriate value, it may be able to adequately control the said energy flow, with less loss of energy than would be possible using a resistor. There would be no electric current spikes as with a capacitor. However, due to the performance characteristics of inductors, whenever field effect transistor 38 or 39, were turned off the voltage across the inductor would spike. Again, the circuit elements required to protect against the voltage spikes would reduce the energy efficiency of the circuit. When inductor 33 and capacitor 34 are used to control the flow of energy through said field effect transistors 38 and 39 (as is done in the present embodiment) a high degree of energy efficiency is achieved. When field effect transistor 38 is turned on, the current through transistor 38 builds in a controlled manner until it is impeded by the charge in capacitor 34. Once so impeded, the current through transistor 38 decreases again until said capacitor 34 is fully charged, by which point field effect transistor 38 turns off. When field effect transistor 39 turns on, the current through it builds up in a controlled manner, but flows in the opposite direction through inductor 33 and capacitor 34, assisted by the charge on said capacitor 34. Again, this continues until impeded by the charge in capacitor 34, which occurs at the point when it becomes charged with the opposite polarity. Each half-cycle is assisted by energy collected in the capacitor 34 during the previous half-cycle, instead of this energy being lost as heat. Also, there are no current or voltage spikes. Thus, a very high level of energy efficiency is achieved.

A diode 35 rectifies the stepped down voltage power input 36 (120 VAC for one phase in the United States and Canada) and charges up the capacitor 37; as shown the inductor 32 is connected to the neutral line. The presence of inductor 33 which can have a value of 7.6 mH and capacitor 34, which can have a value of 1/10 of capacitor 31, regulates current flow to inductor 32 as described previously.

The field effect transistor 38 is connected between the capacitor 37 and one terminal of the inductor 33, and correspondingly a field effect transistor 39 is connected between the neutral line and the same terminal of the inductor 33. Field effect transistors 38 and 39 are alternately switched on and off at the carrier frequency by a computing device, such as a microcontroller 40, through field effect transistor driver 41 and field effect transistor driver 42 respectively, such that they are never simultaneously turned on, and such that excitation energy is added at the carrier/resonant frequency, as detailed below. By keeping the resistance of the inductive elements low, it is thereby possible to recover the unused energy from one half cycle, store it momentarily, and then re-use it for the next half cycle, with very high efficiency. Since the field effect transistors 38 & 39 are either fully on or fully off, and because there are no current spikes flowing through them, the amount of heat dissipation in them is low. This low heat dissipation makes it possible for the transmitter to be very small in size, while still providing a large signal. Inductor 33 prevents current spikes by spreading the current flow into capacitor 34 over ¼ of a cycle, thereby reducing heat dissipation in field effect transistors 38 & 39.

Resistor 43 provides the microcontroller 40 with a synchronization signal at the power-line frequency so that the carrier frequency can be linked mathematically to the power-line frequency. The capacitor 44 helps to attenuate any spikes, which could otherwise interfere with the carrier frequency accuracy. The zener diodes 45 and 46 serve to limit the voltage input to the microcontroller 40 to a specified voltage range. An algorithm in microcontroller 40 modulates the carrier frequency according to a mathematical function of the power-line frequency and the data being transmitted.

Figure 3:
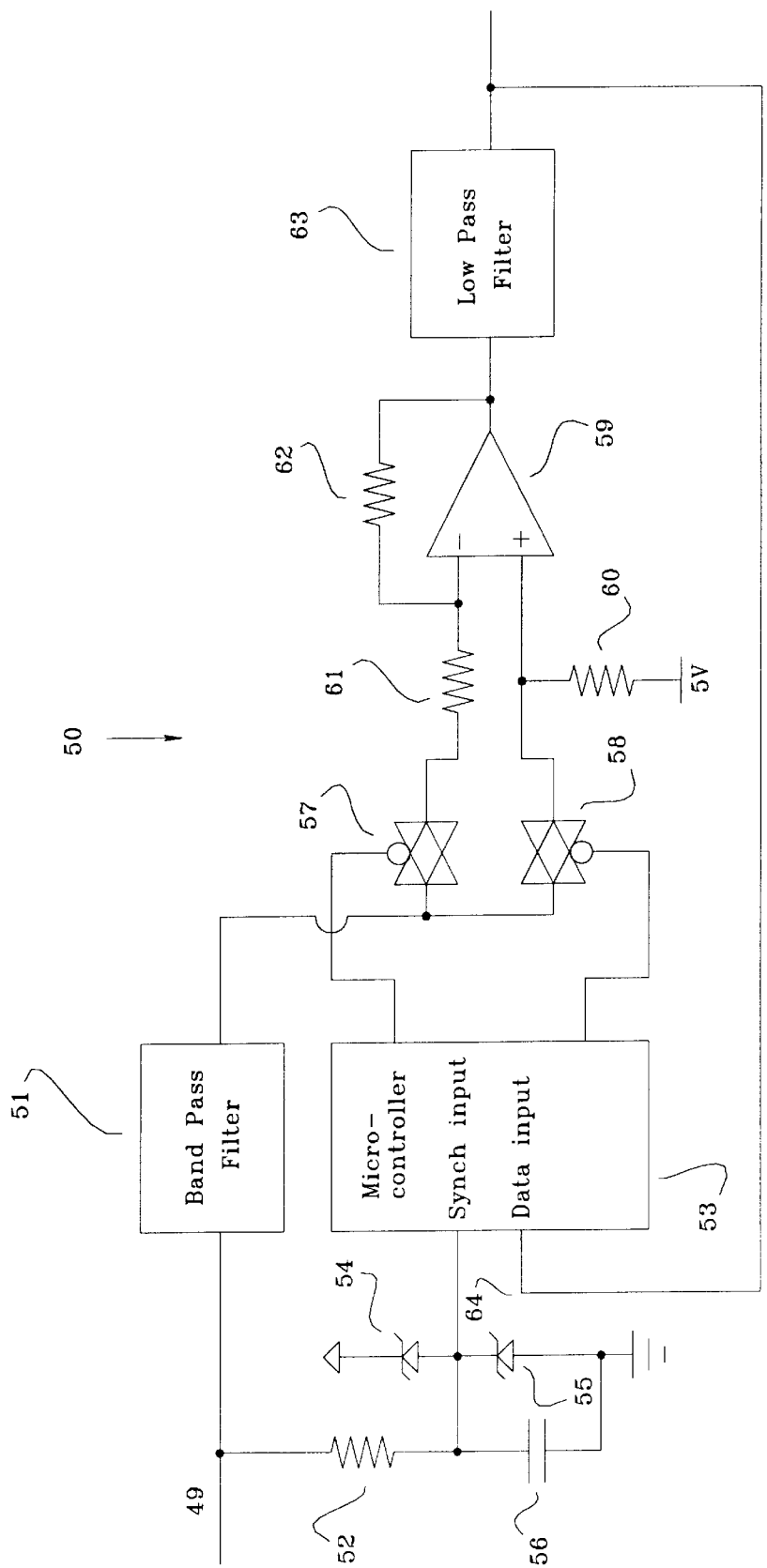
FIG. 3. is a schematic diagram of a power line data receiver according to the present invention.

Referring now to FIG. 3. a receiver circuit 50 is shown which includes a demodulator to demodulate the carrier frequency signal and recover the data. The power line signal is received at 49 and passes through a band pass filter 51 which allows a narrow band of frequencies to pass, including the carrier frequency, for example in a range of 2.8 kHz to 3.26 kHz. As well, the power line signal is fed through resistor 52 to a computing device shown as microcontroller 53, to provide the microcontroller 53 with a synchronization signal at the power-line frequency. As for the transmitter circuit, Zener diodes 54 and 55 serve to limit the voltage input to the microcontroller 53 to a specified voltage range. The capacitor 56 helps to attenuate any spikes, which could otherwise interfere with the accuracy of the carrier decode frequency.

The microcontroller 53 controls a solid state switch 57 and a solid state switch 58 such that they turn on and off alternately at the carrier decode frequency to change the polarity of the output of operational amplifier 59. The switches 57 and 58 could again be field effect transistors or transmission gates such as RCA CD4066. When solid state switch 57 is turned on and solid state switch 58 is turned off, the positive input of operational amplifier 59 is connected to 5 volts through resistor 60. Resistor 61 acts as the input resistor while resistor 62 acts as the feedback resistor, and the operational amplifier 59 acts as an inverting amplifier for the signal coming from the band pass filter 51. When solid state switch 58 is turned on and solid state switch 57 is turned off, the signal from the band pass filter 51 is routed directly to the positive input of the operational amplifier 59. Resistor 62 then acts as a connection between the negative input and the output of the operational amplifier 59, which therefore acts as a non-inverting amplifier for the signal coming from the band pass filter 51. The output of the operational amplifier 59 is fed into a low pass filter 63 which averages the output of the operational amplifier 59. Thereby, the output of said filter is an analog voltage related to the relative phase between the transmitted carrier frequency signal and the carrier decode signal from the microcontroller 53 which controls the solid state switches 57 and 58. For example, if the two signals are in phase the output voltage of the low pass filter 63 will be high. If the two signals are 180° out of phase the output voltage of the low pass filter 63 will be low. If the two signals are 90° out of phase the output voltage will be at the halfway point, which in the preferred embodiment is 5 volts. The output of the low pass filter 63 is fed into the frequency selector input 64 of the microcontroller 53. The carrier decode signal frequency is linked mathematically to the power-line frequency with the same algorithm used in the transmitter microcontroller, as detailed with respect to FIG. 4. In the preferred embodiment, when the output of the low pass filter 63 is greater than 5 volts the frequency selector input will be a logic 1 or high, when it is less than 5 volts it will be considered to be a logic 0 or low.

When the frequency selector input 64 is high, the decode frequency will be the lower of the two possible frequencies. If the data input of the transmitter is also high, the transmitter will also transmit the lower of the two possible carrier frequencies. If the transmitted carrier frequency matches the receiver carrier decode frequency, the phase difference between them will remain constant. Therefore, the output of the low pass filter 64 and the data input to the transmitter 30 will remain at the same level, at logic 1. When the data input at the transmitter 30 changes, to low or logic 0, the transmitted carrier frequency will change, becoming the other of the two frequencies, in the preferred embodiment, this is the higher of the two possible frequencies. When this happens, the transmitted carrier frequency will be different from the receiver carrier decode frequency and the relative phase between the two signals will begin to change. The greater the difference between the two frequencies, the faster the relative phase will change. As the relative phase between the two signals changes, so does the output of the low pass filter 64. After a certain period of time, the length of which depends on the difference between the two frequencies and the time constant for the low pass filter, the output of the low pass filter will change from high or logic 1 to low or logic 0. This in turn will cause the decode frequency to change to the other one of the possible two frequencies. The relative phase will remain the same when the frequency shifts because the circuit uses coherent frequency shift keying. At this point, the frequency selector input 64 will again match the data input at the transmitter and the frequencies will again match. Once the frequencies match again, the relative phase between the two signals will remain constant allowing the output from the low pass filter 64 to remain at logic 0. In this way, the frequency selector input 64 is caused to match the transmitter data input 30, and thus a data signal is transmitted.

The analog means used for signal capture in this invention which compares the transmitted carrier frequency with the carrier decode, or comparison, frequency provides high resolution and therefore high information efficiency for low level signals, while the digital means for maintaining frequency control provides high accuracy, thereby minimizing signal loss due to frequency error. Additionally, because the carrier frequency is proportional to the power-line frequency, noise caused by the harmonics of the power-line frequency can be avoided by choosing a carrier frequency to be mid-way between two harmonics.

Using the power line frequency as a reference makes it easier to reduce the impact of one of the major sources of noise at lower frequencies, namely deviations from the nominally sinusoidal nature of the power waveform which are manifested in the frequency spectrum as harmonic components. Performance of the data communications system may be significantly reduced if a carrier frequency is chosen to be equal or close in frequency to one of these harmonics. Furthermore, the harmonics change in frequency when the power frequency changes, so that it is more likely that a harmonic will coincidentally align with the carrier frequency. By using the power-line frequency as a reference, the carrier frequency can be selected so as not to be in close proximity to the frequency of a power line harmonic. Also, the carrier frequency can float with the power-line frequency so as to follow variations in it, thereby ensuring that the carrier frequency is not at the same frequency as any power line harmonics even if the power-line frequency changes.

Figure 4:
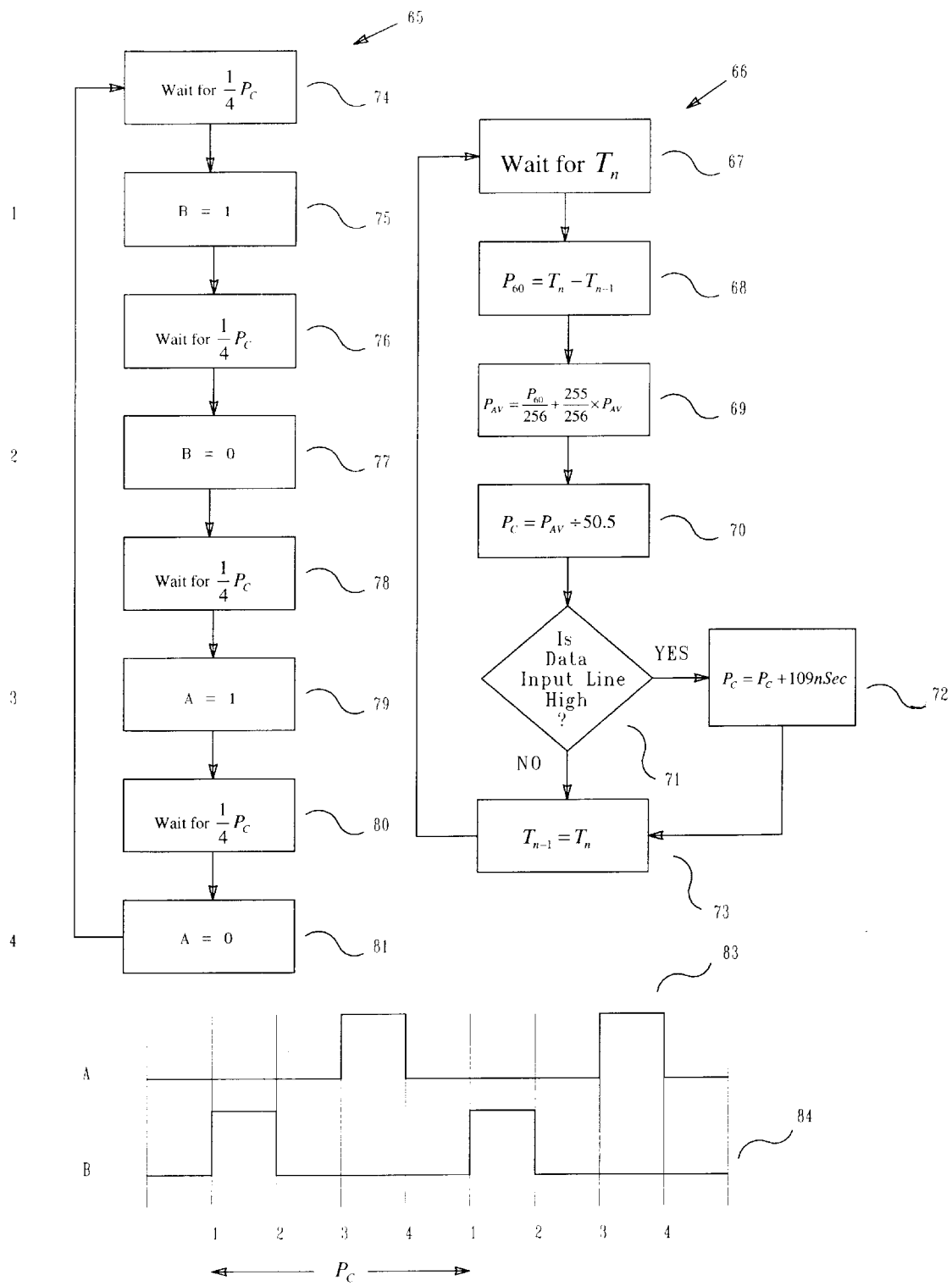
FIG. 4. is a flow chart of the algorithm implemented by the microcontroller shown in the transmitter in FIG. 2. and by the microcontroller in the receiver in FIG. 3 according to the present invention.

Referring now to FIG. 4., two flow diagrams 65 and 66 are given to show the algorithm which causes the carrier frequency to be generated from the power-line frequency. The microcontroller for the transmitter executes both diagrams simultaneously and continuously. This is possible because each diagram has a step where the microcontroller is instructed to wait either for a specified period of time, or for a synch input signal. During the waiting period of one flow diagram, the microcontroller can be executing instructions in the other flow diagram. At step 67 the microcontroller waits for a rising edge at the power-line frequency at the synch input. When this is received, the time value is stored in $T_n$. At step 68 the previous time value is subtracted from this time value to yield $P_{60}$, being the period of the power-line frequency (which is nominally 60 Hz in the United States and Canada). At step 69 $P_{60}$ is averaged together with $P_{AV}$ which is the average of the previous periods of the power-line frequency. In this example, a $1/256$th of $P_{60}$ is added to $255/256$ ths of the previous average $P_{AV}$ to yield the new average $P_{AV}$. In this way, the weighted average $P_{AV}$ of the period of the power-line frequency is continuously updated as new rising edges are received at the microcontroller synch input. It is of course possible to use other fractional values instead of $1/256$ th and $255/256$ ths, and it is also possible, to have other mathematical terms in the averaging equation. What is important is that the transmitter and the receiver use the same averaging equation so that they both have the same carrier frequency. At step 70, $P_C$, the period of the carrier frequency, is calculated by dividing $P_{AV}$ by a constant, in this case 50.5, to give a carrier frequency of 3030 Hz. This constant can be any number, within limits, provided that the transmitter and the receiver use the same number. An additional consideration is the presence of power line harmonic frequencies which can greatly reduce the signal-to-noise ratio. These harmonic frequencies appear at integer multiples of the power-line frequency. By using a non-integer constant, the carrier frequency can be placed in between two harmonics. Then, as the power-line frequency changes, and with it the harmonic frequencies, the carrier frequency will also be changed in a direction to keep the carrier in between the harmonics. At step 71, the data input is checked. If it is high (logic "1"), then an additional constant, in this case 109 nanoseconds, is added to $P_C$ at step 72 thereby causing the carrier frequency to become 3029 Hz. If the data input is low (logic "0"), then step 72 is omitted, and the carrier frequency is therefore 3030 Hz. Thus the algorithm provides frequency modulation of the data appearing at the data input of the microcontroller.

At step 73 the time value for the most recent rising edge is loaded into the $T_{n-1}$ register in preparation for the next rising edge being loaded into the $T_n$ register. The algorithm then loops back to step 67 and the process is repeated.

While waiting for the next rising edge at the synch input, the microcontroller executes the instructions in the flow diagram 65. At step 74, the microcontroller waits for a period of time of ¼ $P_C$ before setting output "B" to a logic "1" at step 75. At step 76 the microcontroller waits for the same period of time before setting output "B" to a logic "0". In steps 78 to 81, the same process is repeated for output "A" which is therefore 180° out of phase with output "B", thereby producing the waveforms 83 and 84 at the carrier frequency.

In summary, a data carrier signal is injected into the secondary terminals of a distribution transformer. In a cyclic manner, electric charge and energy are efficiently recovered from a part of the carrier signal waveform, stored momentarily, and then reused to boost the signal strength in another part of the waveform. This is achieved through the use of a resonant network of active and reactive components, which has been specially designed to enhance energy efficiency. Digital data is applied to the carrier through coherent frequency shift keying in a manner that preserves the energy recovery advantages of the carrier signal generating circuit. The signal frequency and amplitude is such that it appears with sufficient strength on the primary terminals of the distribution transformer, and can travel for miles. Both the transmitter and receiver circuits use the power line waveform as a timing reference to eliminate timing errors. The receiver uses a phase detector and a dual frequency reference signal generator to decode the data being sent. Superior performance is achieved in the receiver circuit through the use of digital methods to maintain frequency control, while employing analog methods for signal capture.

Figure 5:
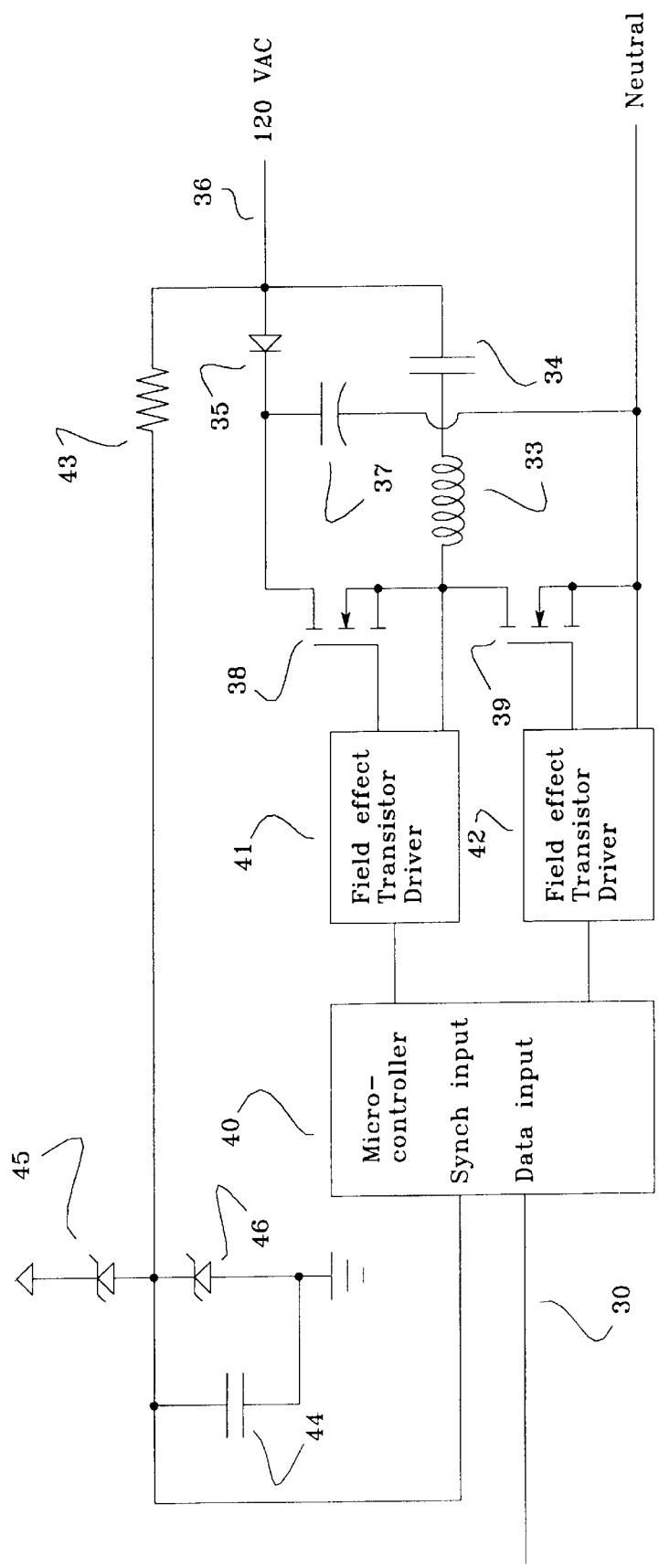
FIG. 5 is a schematic diagram of an alternate embodiment of a power line data transmitter to that shown in FIG. 2, also according to the present invention.

From the foregoing, it will be observed that modifications and adaptations of the preferred embodiment may be effected without departing from the present invention. For example, more than two different frequencies could be transmitted and decoded at the receiver. A use for a three frequency system would be an industrial lift motor controller. One frequency could represent an up signal, a second a down signal and a third, a stop signal. Also, rather than connect to the secondary through a wall socket, the transmitter and receiver could be coupled to one secondary conductor through inductive coupling, or could be coupled to just one secondary conductor with the circuit completed through the use of a common ground mechanism. Also, alternative modulation techniques to coherent frequency shift keying could be used, such as amplitude shift keying and phase shift keying. Also, rather than use two resonant circuits, the transmitter could utilize only one resonant circuit. For example, minimization of current voltage and spikes could be achieved through the use of the second resonant circuit described in the preferred embodiment without the use of the first resonant circuit across the secondary of the transformer. Such alternate embodiment of a transmitter in accordance with the present invention is shown in FIG. 5. The second resonant circuit controls current and voltage transients through the transistors 38, 39 and promotes efficient coupling of the carrier signal. However, the first resonant circuit, that would further promote efficient coupling of the carrier signal, is no longer present. This arrangement might be suitable to cost-sensitive applications. It is to be understood that no limitation with respect to the specific methods and apparatus illustrated herein is intended or should be inferred.

I claim:

1. A power line communication system for transmitting a data signal over power lines carrying a power signal, the system comprising:
   (i) a transmitter having a pair of terminals for connection to the power lines, the transmitter comprising: a carrier frequency generator for generating a carrier frequency modulator by the data signal; and, a switching circuit connected to the carrier frequency generator for being switched by the carrier frequency generator for generating a carrier signal having said carrier frequency, said switching circuit also being connected to the terminals for providing the carrier signal thereto, the switching circuit comprising at least one storage means for storing energy when generating a portion of a cycle of said carrier signal and providing said stored energy when generating another portion of said cycle of said carrier signal; and,
   (ii) a receiver for coupling to the power lines, and comprising: a filter means for filtering the carrier signal from the power line signal, and a demodulator connected to the filter means for extracting the data signal from the carrier signal.

2. A power line communication system as claimed in claim 1, wherein the carrier frequency generator modulates the carrier signal, by frequency shift keying the carrier signal between at least two frequencies, and wherein the demodulator of the receiver comprises means for detecting the different frequencies of the carrier signal, thereby to extract the original signal.

3. A power line data communication system according to claim 1 or 2, wherein the carrier frequency generator includes a transmitter computing device for implementing said modulation.

4. A power line communication system according to claim 3, wherein the transmitter computing device includes a transmitter synchronization input for coupling to at least one power line in use.

5. A power line communication system as claimed in claim 4, wherein the transmitter synchronization input is connected to said at least one power line through a circuit which limits the voltage to the useful range of the transmitter computing device and eliminates spikes which could damage the transmitter computing device.

6. A power line communication system according to claim 1, wherein said switching circuit includes at least one switch operating in non-linear mode being controlled in accordance with the carrier frequency, and wherein a switch driver is connected between the carrier frequency generator and said at least one switch.

7. A power line communication system as claimed in claim 1, wherein the first resonant circuit comprises a capacitor and inductor connected in series between the two terminals of the transmitter.

8. A power line communication system as claimed in claim 1, wherein the transmitter further comprises a first resonant circuit connected between the switching circuit and the pairs of terminals for providing the carrier signal to the power lines.

9. A power line communication system as claimed in claim 8, wherein the switching circuit comprises a pair of switches connected across the first resonant circuit which are switched to operate in non-linear mode, and wherein the carrier frequency generator comprises a transmitter computing device connected to and controlling the switches to control the frequency of the carrier signal, said transmitter computing device also including a data input for the data signal and a synchronization input for connection to the power lines.

10. A power line communication system as claimed in claim 9, wherein the pair of switches comprises a pair of transistors, and wherein drivers are connected between the pair of switches and the carrier frequency generator.

11. A power line communication system as claimed in claim 10, wherein the switches comprise field effect transistors.

12. A power line communication system as claimed in claim 9, 10 or 11, which includes a capacitor and a rectifying circuit connected in series across the pair of terminals of the transmitter, for charging the capacitor from the power line signal, the pair of switches being connected in series across the capacitor.

13. A power line communication system as claimed in claim 12, wherein the first resonant circuit comprises a capacitor and an inductor connected in series between the two terminals of the transmitter and being connected together at a first common node, wherein the pair of switches are connected to a second common node, and the switching circuit comprises a second resonant circuit connected between the first and second common nodes, the second resonant circuit being resonant at a frequency greater than the carrier frequency, whereby, in use, the second resonant circuit can be made to resonate at substantially the carrier frequency by the pair of switches.

14. A power line communication system as claimed in claim 13, wherein said second resonant circuit comprises at least one inductor and one capacitor in series.

15. A power line communication system as claimed in claim 14, wherein the second resonant circuit has a natural resonant frequency greater than the carrier frequency, whereby, in use, the second resonant circuit can be made to resonate at substantially the carrier frequency when it is switched with a duty cycle between zero and one.

16. A power line communication system as claimed in claim 12, wherein the demodulator of the receiver includes a receiver computing device.

17. A power line communication system as claimed in claim 16, wherein the receiver computing device includes a data input for a de-modulated carrier signal and a synchronization input for connection to the power lines.

18. A power line communication system as claimed in claim 16, wherein the receiver computing device comprises a frequency generator for generating a carrier decode frequency, and wherein the demodulator includes a phase detector for comparing the carrier frequency with the carrier decode frequency, and connected to the filter means and the receiver computing device, and means for switching the frequency of the carrier decode frequency when a phase change is detected and for maintaining the carrier decode frequency at a constant frequency when there is no phase change, indicative of the comparison frequency and carrier frequency being the same.

19. A power line communication system as claimed in claim 18, wherein the filter means comprises a bandpass filter having an input for connection to the power lines and an output, and wherein the phase detector comprises an amplifier having an inverting input and a non-inverting input, a pair of switches connecting the output of the bandpass filter to the inverting and non-inverting inputs of the amplifier, with the receiver computing device being connected to the switches for control thereof, and a low pass filter connected to an output of the amplifier, wherein a carrier decode frequency generated by the receiver computing device is used to control the switches to alternatively switch the output of the bandpass filter between the inverting and non-inverting inputs of the amplifier at the carrier decode frequency, whereby the low pass filter produces an output indicative of the phase difference between the carrier decode frequency and the carrier frequency, the output of the low pass filter being connected to the receiver computing device.

20. A power line communication system as claimed in claim 8, wherein the switching circuit comprises at least one switch connected to the first resonant circuit through a second resonant circuit.

21. A power line communication system as claimed in claim 9, wherein said computing device is adapted to turn each switch on for one quarter of each cycle of the carrier frequency and provide a 180° phase shift between the switching on of each switch.

22. A power line communication system as claimed in claim 1, wherein said at least one storage means comprises a capacitor.

23. A power line communication system as claimed in claim 1, wherein said at least one storage means comprises an inductor.

24. A power line communication system as claimed in claim 1, wherein said at least one storage means comprises a capacitor and an inductor.

25. A power line communication system for transmitting a data signal over power lines carrying a power signal having a power-line frequency, the system comprising: (1) a transmitter comprising a pair of terminals for coupling the transmitter to the power lines, and a carrier frequency generator for continuously calculating a carrier frequency as a function of the power-line frequency for adaptively tracking changes in the power-line frequency, said carrier frequency generator having a synchronization input for connection to the power lines and wherein said transmitter generates a carrier signal having said carrier frequency and provides said carrier signal to said terminals and (2) a receiver for connection to the power lines, the receiver comprising a filter means for filtering the carrier signal from the power signal, a demodulator for extracting the data signal from the carrier signal, and a synchronization input for connection to the power lines, said receiver continuously generating a carrier decode frequency as a function of the power-line frequency for adaptively tracking changes in the power-line frequency and for demodulating the carrier signal, wherein both the demodulator and carrier frequency generator utilize a digital algorithm for calculating the carrier frequency and the carrier decode frequency.

26. A power line communication system as claimed in claim 25, wherein the carrier frequency generator includes the digital algorithm for also calculating the carrier frequency as a multiple of the power-line frequency.

27. A power line communication system as claimed in claim 26, wherein the digital algorithm calculates the carrier frequency as a non-integer multiple of the power-line frequency.

28. A power line communication system as claimed in claim 26 or 27, wherein the digital algorithm calculates the carrier frequency as a multiple of the time weighted average of the power-line frequency whereby the carrier frequency follows variations in the power-line frequency.

29. A power line communication system as claimed in claim 28, wherein the carrier frequency generator of the transmitter encodes the data signal by frequency shift keying between at least two different carrier frequencies, each calculated in accordance with the digital algorithm, and wherein the demodulator calculates a carrier decode frequency with the digital algorithm, and includes means for comparing the carrier decode frequency with the receiver carrier frequency.

30. A power line communication system for transmitting a data signal over power lines carrying a power signal having a power-line frequency, the system comprising: (1) a transmitter comprising a pair of terminals for coupling the transmitter to the power lines, a switching circuit connected to the pair of terminals for generating a carrier signal having a carrier frequency modulated with the data signal and a carrier frequency generator for switching the switching circuit at the carrier frequency and for continuously calculating the carrier frequency as a function of the power-line frequency via a digital algorithm for adaptively tracking changes in the power-line frequency, the carrier frequency generator being connected to the switching circuit and having a synchronization input for connection to the power lines, the switching circuit comprising at least one storage means for storing energy when generating a portion of a cycle of said carrier signal and providing said stored energy when generating another portion of said cycle of said carrier signal; and (2) a receiver, for connection to the power lines, and comprising a filter means for filtering the carrier signal from the power line signal, a demodulator for extracting the data signal from the carrier signal, and a synchronization input for connection to the power lines, said receiver continuously generating a carrier decode frequency as a function of the power-line frequency via a digital algorithm for adaptively tracking changes in the power-line frequency and for demodulating the carrier signal.

31. A power line communication system as claimed in claim 30, wherein each of the transmitter and the receiver includes a digital device for calculating the carrier frequency as a multiple of the power-line frequency.

32. A power line communication system as claimed in claim 31, wherein the digital algorithm calculates the carrier frequency as a non-integer multiple of the power line frequency.

33. A power line communication system as claimed in claim 31 or 32, wherein the carrier frequency is calculated as a multiple of a time dependent weighted average of the power-line frequency.

34. A power line communication system for transmitting a data signal over power lines carrying a power signal, the system comprising: (1) a transmitter comprising a pair of terminals for coupling the transmitter to the power lines, a pair of switches connected across the pair of terminals, for applying a carrier signal having a carrier frequency modulated with a data signal to the pair of terminals, a resonant circuit including capacitive and inductive elements and connected to said pair of switches for reducing current and voltage transients, and a carrier frequency generator connected to and controlling the pair of switches to control the frequency of the carrier signal; and (2) a receiver, for connection to the power lines and comprising a filter means for filtering the carrier signal from the power line signal, and a demodulator connected to the filter means for extracting the data signal from the carrier signal.

35. A power line communication system as claimed in claim 34, wherein said transmitter further comprises data input for the data signal and a synchronization input for the connection to the power lines.

36. A power line communication system as claimed in claim 35, wherein the switches are connected at one common node and the resonant circuit is connected between said common node and one terminal of the transmitter.

37. A power line communication system as claimed in claim 36, wherein each switch comprises a transistor, and wherein a driver is connected to each switch.

38. A power line communication system as claimed in claim 37, wherein the switches comprise field effect transistors.

39. A transmitter, for transmitting a carrier signal modulated with a data signal over power lines carrying a power signal having a power-line frequency, the transmitter having terminals for connection to power lines and comprising at least two of: (1) a first resonant circuit connected to the terminals and being substantially resonant at the frequency of the carrier; (2) a carrier frequency generator including a synchronization input for connection to the power lines, said generator continuously calculating the carrier frequency as a function of the power-line frequency via a digital algorithm for adaptively tracking changes in the power-line frequency; and (3) a switching circuit for generating a carrier signal having a carrier frequency modulated by the data signal, said switching circuit comprising at least one storage means for storing energy when generating a portion of a cycle of said carrier signal and providing said stored energy when generating another portion of said cycle of said carrier signal.

40. A transmitter as claimed in claim 39, wherein said switching circuit includes at least one switch and a second resonant circuit which is connected between said at least one switch and the first resonant circuit, said second resonant circuit having a natural resonant frequency greater than the carrier frequency, whereby, in use, the second resonant circuit can be made to resonate at substantially the resonant frequency when said at least one switch is switched at a duty cycle of between zero and one.

41. A transmitter as claimed in claim 40, which includes all of the first resonant coupling circuit, the switching circuit, and the carrier frequency generator.

42. A transmitter as claimed in claim 41, wherein the digital algorithm calculates the carrier frequency as a non-integer multiple of the power line frequency.

43. A transmitter as claimed in any one of claims 41 or 42, wherein the digital algorithm calculates at least two carrier frequencies, wherein the carrier frequencies are close together and the first resonant circuit is substantially resonant at each of the carrier frequencies, whereby the data signal is encoded by frequency shift keying between the carrier frequencies.

44. A receiver for connection to power lines for receiving a data signal encoded in a carrier signal, the receiver comprising: a filter means for filtering the carrier signal from the power line signal; and a demodulator connected to the filter means, for extracting the data signal from the carrier signal, said demodulator comprising a computing device having a synchronization input for connection to the power lines for continuously generating a carrier decode frequency as a function of the power-line frequency for adaptively tracking changes in the power-line frequency and for demodulating the carrier signal, and a phase detector controlled by the computing device, for detecting a phase difference between the carrier decode frequency generated by the computing device and the frequency of the carrier signal, whereby the computing device can switch the carrier decode frequency to the frequency of the carrier signal, thereby to extract the data signal from the carrier signal.

45. A method of transmitting a data signal over power lines, the method comprising generating a carrier signal having a carrier frequency modulated with the data signal, applying the modulated carrier signal to the power lines at one location and receiving and demodulating the carrier signal at another location, the method comprising at least two of: (1) resonantly coupling the carrier signal to the power lines using a first resonant circuit; (2) continuously digitally calculating the carrier frequency as a function of the power-line frequency for adaptively tracking changes in the power-line frequency; and, (3) generating the carrier signal via a switching circuit, which includes storing energy when generating a portion of a cycle of said carrier signal and providing said stored energy when generating another portion of said cycle of said carrier signal.

46. A method as claimed in claim 45, which includes limiting current and voltage spikes in said switching circuit by using a second resonant circuit.

47. A method as claimed in claim 46 which includes all the steps (1), (2), and (3) and wherein step (2) comprises calculating the carrier frequency as a multiple of the power-line frequency.

48. A method as claimed in claim 47, which includes calculating the carrier frequency as a non-integer multiple of the power-line frequency.

49. A method as claimed in claim 48, which includes, at the other location where the carrier signal is received, comparing the carrier frequency of the received carrier signal with a carrier decode frequency, and changing the carrier decode frequency until the carrier decode frequency is the same as the carrier frequency, thereby to demodulate the carrier signal.

50. A method as claimed in claim 49, which includes comparing the carrier frequency and the carrier decode frequency by a phase detection system.

51. A method as claimed in claim 50, which includes calculating the carrier frequency for transmission and for reception, using a digital algorithm common to the transmitter and receiver.

52. A method as claimed in claim 51, which includes calculating the carrier frequency from a time dependent weighted average.

53. A method as claimed in claim 51, which includes calculating the period for the carrier frequency by: (1) calculating a time dependent weighted average for the period of the power-line frequency; (2) dividing the calculated average period of the power-line frequency by a number selected to give a carrier frequency that is a non-integer multiple of the power-line frequency; and (3) for at least one value of the data input line, adding a fixed constant to the period of the carrier frequency, thereby to generate at least two different carrier frequencies for different values of the data input line.

54. A method as claimed in claim 46, which includes providing the second resonant circuit with a capacitor and inductor selected to have a natural resonant frequency greater than the carrier frequency, and switching the second resonant circuit at a duty cycle between 0 and 1, thereby to cause said resonant circuit to resonate at substantially the carrier frequency.

55. A method as claimed in claim 45, which includes providing at least two different carrier frequencies, and modulating the carrier signal with the data signal by frequency shift keying between the carrier frequencies.

56. A method as claimed in claim 45, which includes providing for step (3), two field effect transistors, turning each field effect transistor on for one quarter of each cycle of the carrier frequency, and providing a 180° phase shift between the switching on of each field effect transistor.

57. A power line communication system for transmitting a data signal over power lines carrying a power signal having a power-line frequency, the system comprising: (1) a transmitter comprising a pair of terminals for coupling to the power lines, and a carrier frequency generator including a digital computing device for continuously calculating a carrier frequency as a function of the power-line frequency for adaptively tracking changes in the power-line frequency, the carrier frequency generator having a synchronization input for connection to the power lines and the transmitter generating a carrier signal having the carrier frequency and providing the carrier signal to the terminals; and (2) a receiver for connection to the power lines, the receiver comprising a filter means for filtering the carrier signal from the power line signal, and a demodulator including a digital computing device for extracting the data signal from the carrier signal.

58. A power line communication system as claimed in claim 57, wherein the digital computing devices of the carrier frequency generator and the demodulator implement a digital algorithm for calculating the carrier frequency as a non-integer multiple of the power-line frequency.

59. A power line communication system as claimed in claim 58, wherein the carrier frequency is calculated as a multiple of a time dependent weighted average of the power-line frequency.

60. A power line communication system as claimed in claim 59, wherein the carrier frequency generator in the transmitter encodes the data signal by frequency shift keying between at least two different carrier frequencies, each calculated in accordance with the digital algorithm, and wherein the demodulator calculates a carrier decode frequency using the digital algorithm, and includes means for comparing the carrier decode frequency with the received carrier frequency.

* * * * *

UNITED STATES PATENT AND TRADEMARK OFFICE
CERTIFICATE OF CORRECTION

PATENT NO.      : 6,549,120 B1
DATED           : April 15, 2003
INVENTOR(S)     : Eric de Buda It is certified that error appears in the above-identified patent and that said Letters Patent is hereby corrected as shown below:

<u>Column 11,</u>
Line 57, the line "modulator by the data signal; and, a switching circuit" has been changed to -- modulated by the data signal; and, a switching circuit --.

<u>Column 17,</u>
Line 10, "frequency by a phase detection system." has been changed to -- frequency by a phase detection technique. --

Signed and Sealed this

Twenty-third Day of March, 2004

JON W. DUDAS
*Acting Director of the United States Patent and Trademark Office*